Figure 1:
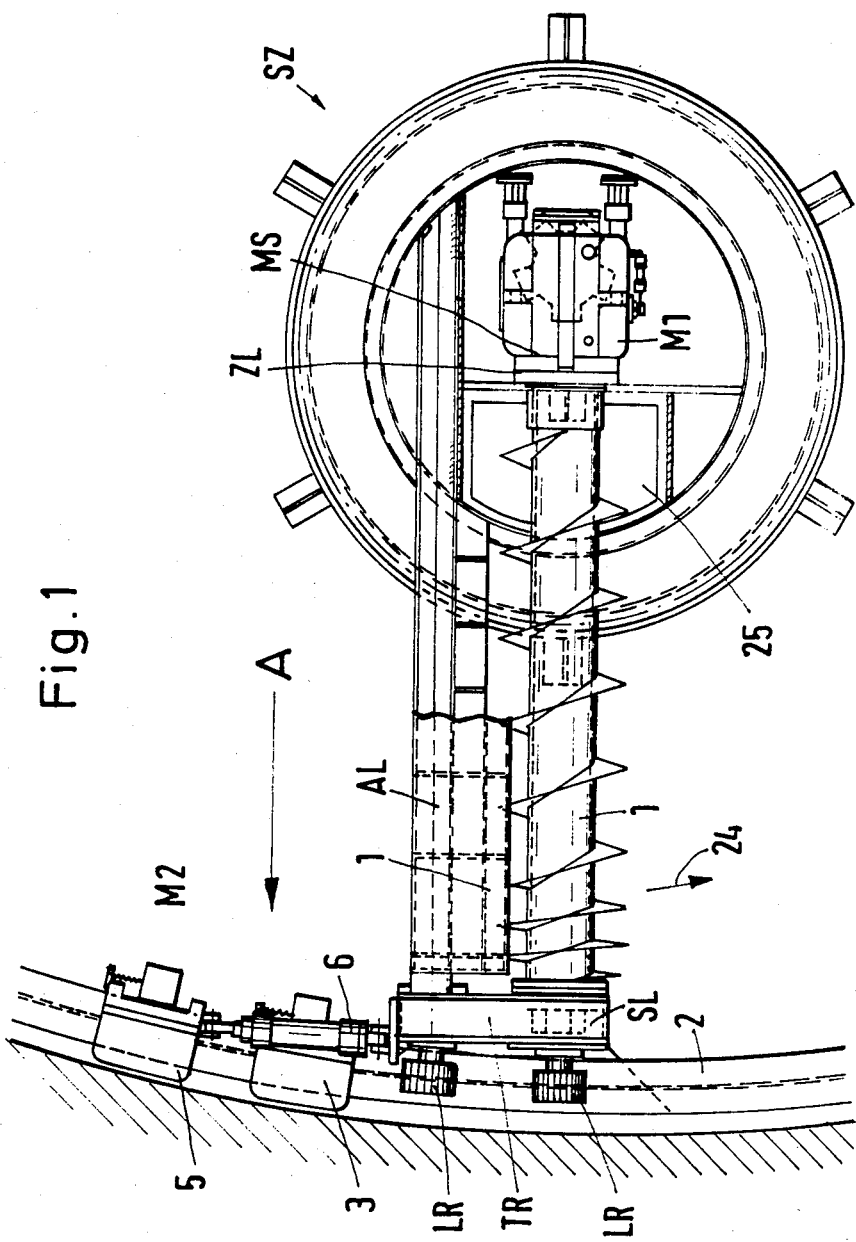

United States Patent [19]

Greeb

[11] Patent Number: 4,708,567

[45] Date of Patent: Nov. 24, 1987

[54] MOTIVE POWER DEVICE FOR A DELIVERY DEVICE FOR A SILO OR A SIMILAR UPRIGHT CONTAINER

[75] Inventor: Herbert Greeb, Dillenburg, Fed. Rep. of Germany

[73] Assignee: Gebrüder Weiss K. G., Fed. Rep. of Germany

[21] Appl. No.: 829,793

[22] Filed: Feb. 14, 1986

[30] Foreign Application Priority Data

Feb. 18, 1985 [DE] Fed. Rep. of Germany ....... 3505533

[51] Int. Cl.$^4$ ............................................. B65G 65/46
[52] U.S. Cl. .................................... 414/310; 414/326; 198/657; 198/859; 254/106; 254/107; 74/162
[58] Field of Search ............... 414/306, 307, 308, 310, 414/311, 312, 313, 314, 315, 316, 317, 318, 319, 320, 321, 322, 326, 327; 198/859, 587, 657; 254/105, 106, 107; 74/162, 165, 166

[56] References Cited

U.S. PATENT DOCUMENTS

| | | | |
|---|---|---|---|
| 1,275,558 | 8/1918 | Holmgreen | 414/310 |
| 2,579,153 | 12/1951 | Meissner | 414/310 |
| 2,830,788 | 4/1958 | Bentley et al. | 254/106 X |
| 3,050,201 | 8/1962 | Humphrey | 414/310 |
| 3,368,703 | 2/1968 | Lusk | 414/320 X |
| 3,702,689 | 11/1972 | Zeller | 254/107 |
| 3,832,945 | 9/1974 | Muto et al. | 254/107 X |
| 4,063,654 | 12/1977 | Shivvers | 414/310 X |

FOREIGN PATENT DOCUMENTS

| | | | |
|---|---|---|---|
| 174198 | 3/1953 | Austria | 254/107 |
| 2346160 | 3/1975 | Fed. Rep. of Germany | 414/310 |
| 1579235 | 11/1980 | United Kingdom | 254/106 |

*Primary Examiner*—Frank E. Werner
*Attorney, Agent, or Firm*—Toren, McGeady & Associates

[57] ABSTRACT

Motive power device for a delivery device located at the base of an upright silo in the shape of a worm screw rotatable about its longitudinal axis, which is swivelable around a central bearing across a circular annularly shaped bottom surface of the silo with the help of a step motor, which consists of two identically designed shoe brakes self-locking counter to the drive direction and engaging at an abutment assigned to the silo wall, of which the one is linked rigidly and the other one displaceably through a controllable power cylinder in the area of a support bearing of the worm and cooperates with the abutment located at the silo wall.

5 Claims, 6 Drawing Figures

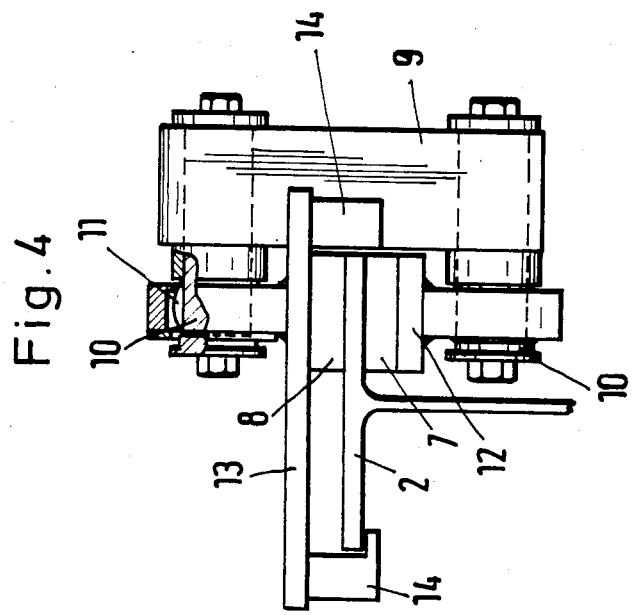
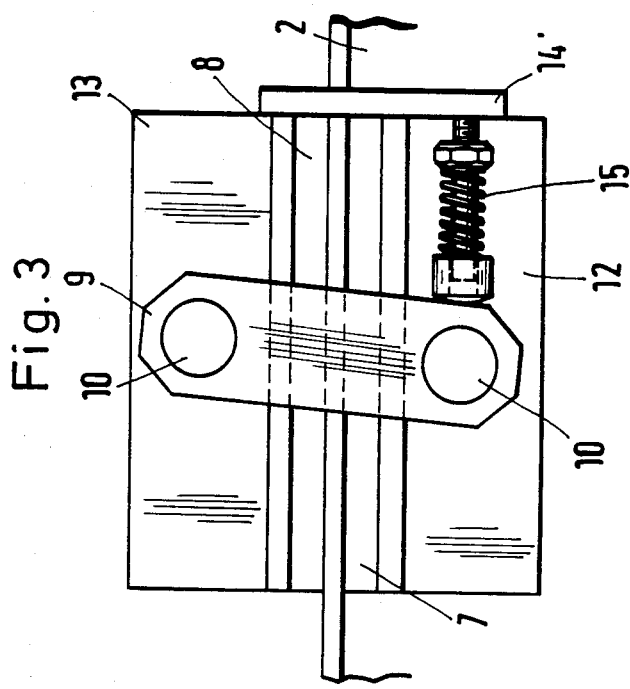

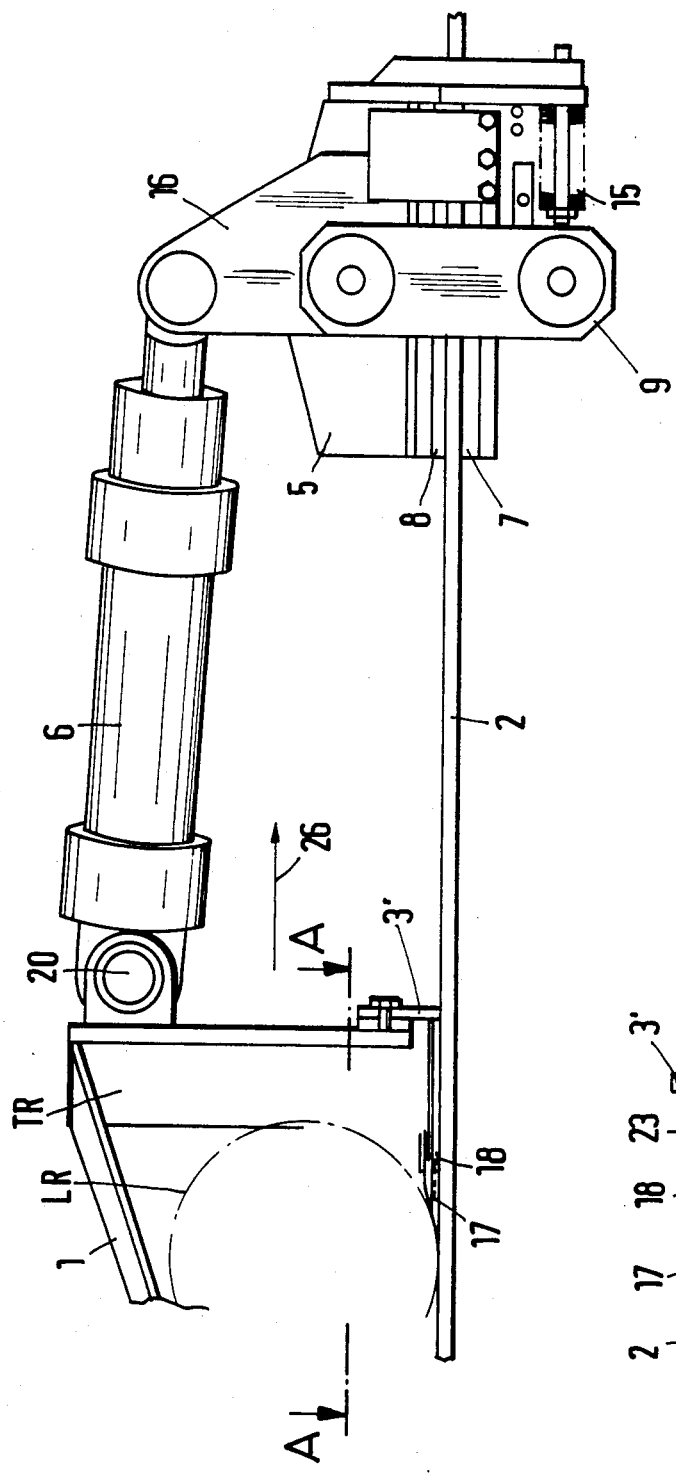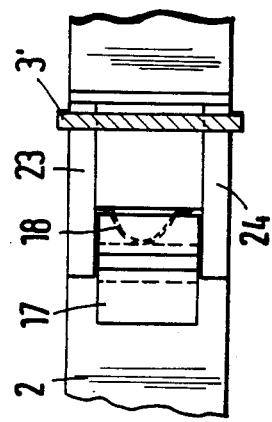

MOTIVE POWER DEVICE FOR A DELIVERY DEVICE FOR A SILO OR A SIMILAR UPRIGHT CONTAINER

The invention is directed to a motive power device for a delivery device located at the base of an upright silo or similar.

In a known motive power device of this type the end of the endless screw serving as a delivery tool proper facing the silo wall is rotatably supported in a carriage, on which a motor is arranged, which engages by means of a pinwheel in corresponding holes in the abutment assigned to the silo wall and which in this way swivels the endless screw rotating around its longitudinal axis across the circular annular-shaped bottom surface of the silo. In this manner the entire bottom surface of a material column located in the silo can be milled off and delivered, compare U.S. Pat. No. 3,501,029.

Since considerable forces act upon such a motive power device during delivery of the material located in the silo, such a carriage because of its relatively great length considerably brakes the swiveling motion representing the feed motion of the motive power device, the set of teeth fails therefore very rapidly. Also the holes in the abutment are very rapidly clogged by wet and smeary material, so that feed motions are no longer possible after a short period of operation.

A remedy for this problem can not be created by means of friction wheels, because these slip through in the case of wet, smeary or even greasy silo materials. Accordingly, an advance feed thus becomes completely impossible.

The invention is based upon the task, to create a new motive power device for the advance feed of a delivery device of the previously mentioned type, which enables a secure forward movement, but also a secure immobilization of the delivery device in case the forward feed is zero also under the most difficult operational conditions, which consists of simple components requiring little maintenance as well as operating malfunction-free over long operational periods.

The inventive motive power device also includes two brakes having identical components, which are linked in a different manner to the cantilever carrying the delivery worm, in such a way, that the brake acting as a restraining brake is connected with the delivery device through a linkage in an as it were rigid manner and the brake acting as advance The motive power device according to the invention includes at least one delivery worm rotatable about its longitudinal axis and swivable around a central bearing across the bottom surface of the silo. The delivery worm has a support bearing at its end facing away from the central bearing. An abutment is located at the silo wall on which the support bearing is placed. The rotational movement of the worm is effected by a first central motor and the swivelling movement is effected by a second motor assigned to the end facing away from the central bearing. The second motor is a step motor engaging between the abutment and the support bearing which is self-locking in drive direction. feed brake is connected displaceably with the delivery device by means of a controllable power cylinder. Both brakes however, exhibit one upper and one lower interchangeable brake shoe, whose brake shoe supports are displaceably connected with each other by means of a tongue, whereby the upper brake shoe in particular rests upon the abutment because of its proper weight while the lower brake shoe is pressed against the bottom side of the abutment by means of the prestressing spring designed as a pressure spring which is arranged at the lower end of the brake shoe support and thus acts directly upon the lower brake shoe. Thus both brake shoes rest at the abutment with a certain prestress. The tongue being at a certain angle because of the preload causes a self-locking of the brake shoes, which increases with increasing load and thus jams the brakes tightly, thus securely blocking the delivery device in its momentary position. According to an additional layout of the invention it is possible to in addition apply an added hydraulic brake pressure to the brake shoe supports by means of in itself known hydraulic actuators, so that even unusually high forces acting upon the delivery device can be safely handled.

According to a refinement of the invention the brakes are designed differently, whereby the one brake comprises brake shoes, which embrace the abutment from above and below and are connected in such a way flexibly by means of an articulated tongue, that both the brake shoes are movable into the braking position in case of a translational motion initiated at the upper brake shoe, while the second brake is a loosely guided wedge, which is biased by a spring and arranged in such a way between the abutment and the associated roller, that a motion of the delivery worm counter to the advance feed motion is blocked.

For this purpose the wedge in cooperation with the roller supported upon the abutment is designed to be self-locking and comprises a brake lining on its side facing the abutment.

The spring is appropriately a fastening spring which retains the wedge in contact with the roller.

The wedge is loosely guided in a pocket bounded by the side walls, the traverse and the abutment.

As soon as the power cylinder is extended, the power cylinder abuts against the blocked advance-feed brake and thus moves the delivery device forward. Because of this the restraining brake which is still blocked at the beginning of the forward movement is automatically released since it is rigidly connected with the delivery device by means of the linkage. This occurs in the fashion that the delivery device in the course of its forward movement caused by the power cylinder moves the restraining brake in advance feed direction through the linkage, thereby changing the angle of the tongue and thus cancelling the clamping action of the brake shoes. It is achieved by the preloading spring, also in case the brake is released, that the brake shoes always somewhat rest at the abutment, in order in this way to limit the play of the brake to a minimum. Hereby, furthermore, the sliding contact faces of the brakes are always necessarily cleaned, so that silo material possibly resting thereon is moved to the side. After reaching the end position the power cylinder is reversed and retracted. Hereby the restraining brake is activated by the pressure exerted by the delivery device upon it and retains the delivery device in its assumed position, while the advance feed brake is released by the retracted power cylinder and is pulled together with same until the power cylinder is completely retracted.

The inventive arrangement of two brakes connected with the delivery device through a power cylinder and a fixed linkage thus constitutes a step motor acting counter to the advance feed direction in a self-locking manner, with whose help also relatively high resisting forces can be safely overcome.

From the DE-AS No. 2 642 821 there is indeed known a step switching device for a delivery device arranged at the base of an upright silo, however in that case the force transmittal occurs through a gear wheel unit, which exhibits the previously described disadvantages to an even greater extent.

The invention is described subsequently with the help of an embodiment example depicted in a more or less schematic manner in the drawing. It is shown on FIG. 1 a partially sectioned cutout from a silo comprising the inventive delivery device in plan view with a motor for the rotational movement and a motor for the swiveling movement of the delivery device, FIG. 2 a side view in direction of the arrow A in FIG. 1 of the motor designed as a step motor effecting the swiveling motion of the delivery device in magnified presentation, FIG. 3 a side view of a portion of the step motor in the form of a brake shoe in magnified presentations, FIG. 4 a front view of the shoe brake according to FIG. 3 presented partially in section, FIG. 5 a second embodiment of a brake for the delivery device according to FIGS. 1 and 2, and FIG. 5a a section along the line A—A in FIG. 5.

As FIG. 1 shows, a delivery device designated with AE in its entirety which centrally penetrates the base of an upright silo only sketched here as an organ which removes and delivers the silo content not shown here comprises an endless screw or worm 1 with a differing pitch, which is supported to be rotatable around its longitudinal axis at a cantilever AL by means of a central bearing ZL and a support bearing SL arranged at the facing away end. The cantilever is arranged in the central swiveling cylinder SZ with its one end, which comprises a first motor M1 for rotation of the worm 1 around its longitudinal axis. At the other end the cantilever comprises a front side cross bar TR, at which a second motor M2 is linked facing away from the movement direction of the delivery device, which is supported at an abutment facing one of the silo walls, which viewed from above is designed to be annularly shaped and at least T-shaped in cross-section. Compare also FIG. 4. Two rollers LR are connected with the cross bar TR which roll on the abutment 2.

The motor M2 is designed as a so-called step motor. For this purpose a shoe brake 3 through a linkage 4 and a shoe brake 5 through a controllable power cylinder 6 is connected in an articulated manner with the cantilever AL in the area of the support bearing SL, therefore at the tie bar TR. As is particularly shown in FIG. 2, the shoe brakes 3 and 4 are designed to be identical, its exchangeable upper brake shoe 7 with respect to the abutment 2 and its thereto interchangeable brake shoe 8 are arranged on respectively one upper and lower brake lining carrier 12 and 13 connected with each other respectively by a tongue 9, bolt 10 and swivel bearing 11, compare also FIG. 4. The swivel bearings 11 enable a better adaptation of the brake lining carriers 12 and 3 and thus the brake shoes 7 and 8 to the abutment 2 also under difficult operational conditions.

Figure 2:
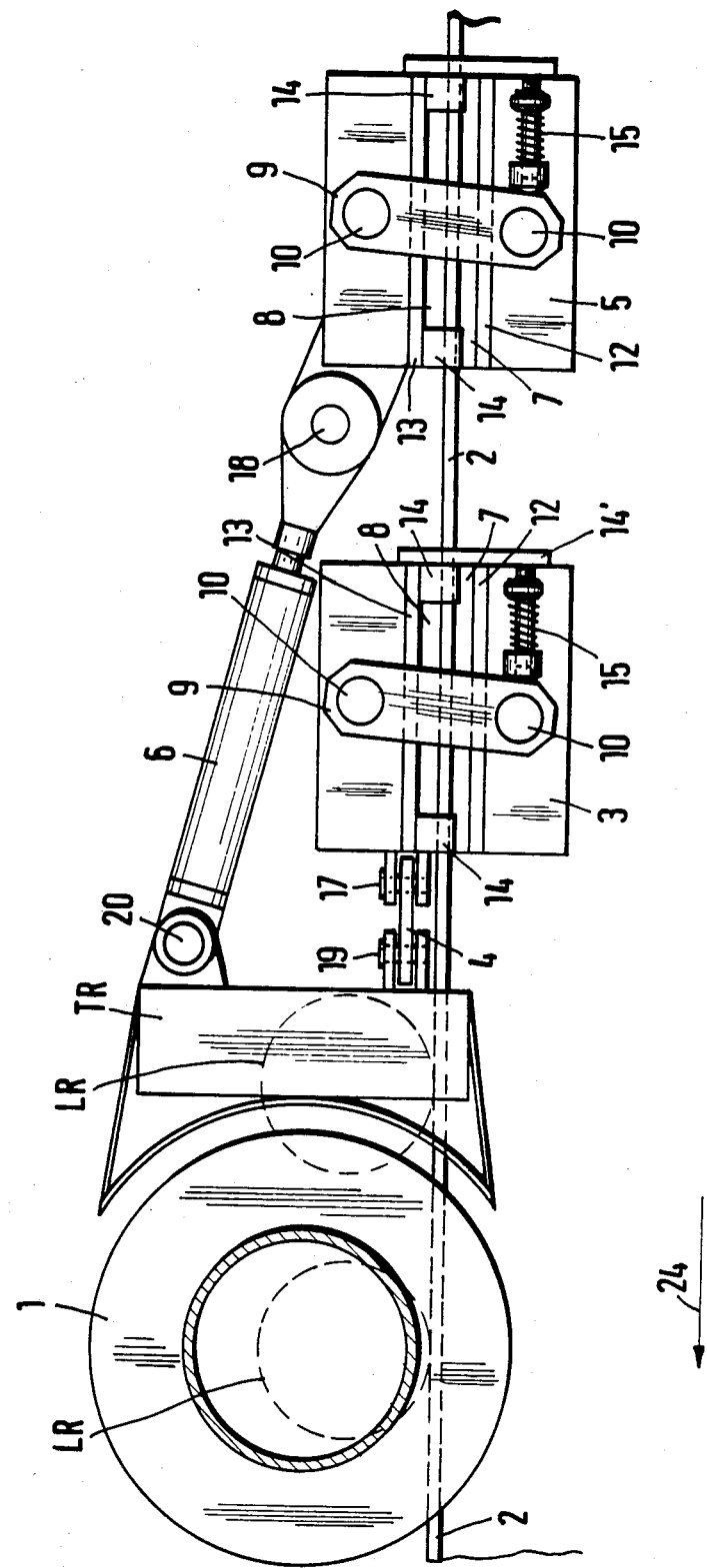

Furthermore, each shoe brake 3 and 5 comprises guide ledges 14 for the brake lining carriers 12 and 13 as well as a prestressing spring 15 engaging into the lower area of the tongue 9 respectively in reference to FIG. 2, which is carried by a crossbar 14' of the guide ledge 14 and maintains the brake shoes 7 and 8 respectively in contact with the abutment 2, as this is particularly clearly shown in FIG. 3.

The linkage points 17 and 18 of the linkage 4 and the power cylinder 6 are located at the upper brake shoe carrier 12, as seen in FIG. 2, while the linkage points 19, 20 are arranged respectively at the end of the cantilever AL assigned to the support bearing SL, thus at the rear edge of the tie bar TR.

The operational mode of the described arrangement is as follows.

In the arrangement depicted in FIG. 2 the preloading springs 15 retain both shoe brakes 3 and 5—of which in the following the shoe brake 3 is designated as the restraining and the shoe brake 5 the forward feed brake—in the braking position. The power cylinder 6 is in the retracted position of rest.

When the power cylinder 6 is extended, commanded by a control circuit not depicted here, the cantilever and with it the worm 1 is swiveled in forward-feed direction in reference to FIG. 2 in direction of the arrow 24 and thus in reference to FIG. 1 around the midpoint MS of the only partially depicted silo, and indeed to the extent of the extension travel of the power cylinder 6. The articulation point 18 of the power cylinder 6 namely is maintained stationary by the advance feed brake 3 in engagement with the abutment 2. Because of the articulation at the upper brake lining carrier 13 and through the constrained guidance of the lower brake lining carrier 12 occurring through the articulated tongue 9 the brake force of the shoe brake increases with increasing pressure, so that the articulation point 18 is maintained stationary also in case of large advance feed forces generated by the resistance of the material to be removed.

When moving the cantilever and with it the worm 1 in direction of the arrow 24, the restraining brake 3 without braking effect is carried with it through the linkage 4 to the same extent, because the brake lining carrier 13 moves both brake shoes 7 and 8 away from each other counter to the force of the prestressing spring 15 by means of the upper brake lining carrier 13 and the tongue 9 and thus into a position releasing the abutment 2.

As soon as the retraction order has been given to the power cylinder 6 by the control circuit, same returns again into the retracted position depicted in FIG. 2. Hereby the cantilever and with it the worm 1 is maintained in its momentary position by the restraining brake 3 which is in the braking position, while the advance feed brake 5 is transported without braking effect into a new position in direction of the arrow 24 by the power cylinder 6 which is shortening itself. Through the pull at the upper shoe carrier 13 both brake shoes of the advance feed brake 5 are transposed into a position without braking effect through the tongue connection 9/10, while by the pressure of the linkage 4 both brake shoes of the restraining brake 3 are transferred into the braking position depicted in FIG. 2 through the tongue connection 9/10.

By renewed extension of the power cylinder there occurs a renewed forward feedmovement. If one takes care that the distance between the restraining brake 3 and the forward feed brake 5 is greater than the length of the extension travel of the power cylinder 6, the above-described components form a so-called step motor, by means of which the delivery device is swivelable stepwise around the center MS, while independently thereof the worm 1 is rotated around its longitudinal axis by the motor M1. The material removed thereby from the base surface of the material column contained in the silo is thus conveyed in continuously widening worm threads to a delivery opening 25 located at the bottom of the silo.

If particularly difficult material has to be removed, the above-decribed shoe brakes 3 and 5 can be additionally equipped with hydraulically actuated actuators, by which the brake pressure can be further increased. Naturally then these hydraulical actuators have to be made so as to be adapted to the control of the power cylinder 6 by control device not depicted here.

A further embodiment of the brake designated with the reference number 3 in FIG. 2 is represented in FIGS. 5 and 5a.

Instead of the brake shoes 12 and 13 a wedge 17 has been provided here, which is loosely retained in a pocket formed out of the side walls 23 and 24, the abutment 2 and the roller LR and is biased by a spring 18 in the direction towards the roller LR. Side walls 23 and 24 are retained at a side wall 3', which is screwed together with the crossbar TR. The wedge angle of the wedge 13 has been chosen in such a way, that the wedge in cooperation with the roller LR abutting upon the abutment 2 enters into a self-locking position if the delivery device 1 is moved in direction of the arrow 26. The spring 18 is designed as a retaining spring and retains the wedge 17 always in contact with the roller LR. If the delivery device 1 is moved in forward feed direction, meaning counter to the direction of the arrow 26, the wedge 17 has no effect whatsoever.

The effects described above also appear with such an embodiment at the braking device 3, meaning when the power cylinder 6 is extended there occurs an unbraked forward feed movement of the delivery device 1, while during the delivery proper all movements of the delivery device 1 in direction of the power cylinder 6 are prevented by the wedge 17 jamming between the roller LR and the abutment 2.

The forward feed pressure and the forward feed velocity are freely selectable by means of a control device not shown here; this applies to the forward feed pressure particularly then, if the contact pressure of the shoe brake is greatly increased by the hydraulic actuator.

With the help of the described step motor silos in particular also so-called bioreactors with diameters of larger than 10 m can be emptied in an accurately controlled manner and over long operating periods in a safe and maintenance-free manner.

We claim:

1. A motive power device for a delivery system located at the base of an upright silo or similar container, comprising at least one delivery worm having first and second ends and a longitudinal axis, the worm rotatable about the longitudinal axis, the first end of the worm attached to a central bearing across the bottom surface of the silo, the second end of the worm having a support bearing, a cantilever member carrying the worm connected to the support bearing, the support bearing placed on an abutment located adjacent the silo wall, a first motor at the first end of the worm for effecting the rotation of the worm and a second motor at the second end of the worm for effecting the swivelling motion of the worm, the second motor being a controllable hydraulic work cylinder, a first braking device self-locking counter to the swivel motion of the worm and acting on the abutment, an end of the work cylinder hinged to the first braking device, the outer end of the work cylinder hinged to the support bearing of the worm, wherein the first braking device has upper and lower brake shoes each facing the abutment, the braking device further including an articulated tongue for flexibly connecting the brake shoes, the brake shoes movable between the braking position in which both brake shoes are immovably pressed against the abutment and a released position, the braking position effected by a translatory movement introduced via the work cylinder to the upper brake shoe counter to the drive direction of the worm and the released position effected by a movement in the drive direction of the worm.

2. The device according to claim 1, comprising a second braking device rigidly linked to the support bearing, the second braking device having upper and lower brake shoes each facing the abutment, the braking device further including an articulated tongue for flexibly connecting the brake shoes, the brake shoes movable between a braking position in which both brake shoes are immovably pressed against the abutment and a released position, the braking position effected by a transitory movement introduced to the upper brake shoe counter to the drive direction of the worm and the released position effected by a movement in the drive direction of the worm, wherein the spacing between the first and second braking devices is larger than the effective travel length of the work cylinder.

3. The device according to claims 1 or 2, comprising hydraulic actuators acting on the braking devices for increasing the brake pressure.

4. The device according to claims 1 or 2, wherein the brake shoes are maintained in contact with the abutment by a prestressing spring located on a lower brake shoe carrier and acting on the tongue.

5. The device according to claims 1 or 2, comprising lining carriers for the upper and lower brake shoes, and swivel bearings mounted on the lining carriers for supporting the tongues connecting the upper and lower brake shoes.

* * * * *